US011457694B2

(12) United States Patent
Kumar et al.

(10) Patent No.: US 11,457,694 B2
(45) Date of Patent: Oct. 4, 2022

(54) BIO-MIMICKED THREE-DIMENSIONAL LAMINATED STRUCTURE

(71) Applicant: National Taiwan University of Science and Technology, Taipei (TW)

(72) Inventors: Ajeet Kumar, Taipei (TW); Jeng-Ywan Jeng, Taipei (TW); Yun-Peng Yeh, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 152 days.

(21) Appl. No.: 17/083,279

(22) Filed: Oct. 28, 2020

(65) Prior Publication Data
US 2021/0186152 A1 Jun. 24, 2021

Related U.S. Application Data

(60) Provisional application No. 62/953,327, filed on Dec. 24, 2019.

(51) Int. Cl.
| | |
|---|---|
| *B32B 3/12* | (2006.01) |
| *A43B 13/18* | (2006.01) |
| *A43B 13/02* | (2022.01) |
| *A43B 13/04* | (2006.01) |
| *A43B 13/20* | (2006.01) |
| *B33Y 80/00* | (2015.01) |
| *F16F 7/12* | (2006.01) |
| *B33Y 10/00* | (2015.01) |

(52) U.S. Cl.
CPC .......... *A43B 13/181* (2013.01); *A43B 13/023* (2013.01); *A43B 13/04* (2013.01); *A43B 13/189* (2013.01); *A43B 13/20* (2013.01); *B32B 3/12* (2013.01); *B33Y 80/00* (2014.12); *F16F 7/121* (2013.01); *B32B 2307/56* (2013.01); *B32B 2437/02* (2013.01); *B33Y 10/00* (2014.12)

(58) Field of Classification Search
CPC ..... A43B 13/023; A43B 13/04; A43B 13/125; A43B 13/181; A43B 13/186; A43B 13/189; A43B 13/20; A43B 1/0009; B32B 2307/56; B32B 2437/02; B32B 3/12; B33Y 10/00; B33Y 80/00; F16F 7/121
See application file for complete search history.

(56) References Cited

U.S. PATENT DOCUMENTS 10,087,531 B2 * 10/2018 Sabolsky ............ H01M 8/1246

* cited by examiner

*Primary Examiner* — Lawrence D Ferguson (57) ABSTRACT

A invention disclosed a bio-mimicked three-dimensional laminated structure at least comprising a flexible lattice structure, which is characterized in that the flexible lattice structure comprises a plurality of particle units are uniformly disposed and evenly distributed in the X-axis, the Y-axis, and the Z-axis direction and evenly distributed as a lattice matrix of an array grid in an identical plane; wherein each of the particle units is an opened hollow shell or a close shell. The design eliminates the need for support structures and the subsequent post-processing required to remove them. A shell-shaped close cell bio-mimicked three-dimensional laminated structure bio-mimicking a sea urchin shape was introduced for the load-bearing structure application.

17 Claims, 9 Drawing Sheets

BIO-MIMICKED THREE-DIMENSIONAL LAMINATED STRUCTURE

CROSS REFERENCE TO RELATED APPLICATIONS

The present application claims the benefit of U.S. Provisional Application No. 62/953,327 filed on Dec. 24, 2019, the contents of which are incorporated herein by reference in their entirety.

STATEMENT REGARDING PRIOR DISCLOSURES BY AN INVENTOR OR JOINT INVENTOR

This invention was described in a printed publication by inventor on 19 Mar. 2020 entitled "Design and additive manufacturing of closed cells from supportless lattice structure" in Additive Manufacturing, Volume 33, May 2020, 101168.

BACKGROUND OF THE INVENTION

1. Field of the Invention

The invention relates a cell bio-mimicked three-dimensional laminated structure using in an additive manufacturing process, especially closed cell bio-mimicked three-dimensional laminated structure with material extrusion process from bio-mimicked and for footwear midsole.

2. Description of the Related Art

Human made load bearing structures, used in the fields like biomedical, automotive, space and civil are dense solids like steel, concrete, glass, etc., but natural load bearing structures are light weight and yet stiff enough for its surrounding environment. Reason behind natural structure being so efficient and functionally optimized because it uses the cellular lattice structure as a fundamental design tool for its structure. This lattice structure which have been developed over long time adapting evolutions, such as in cedarwood, cork, trabecular bone, etc. has intricate and ingenious shape and designs. Going deeply into its structure one can conclude that nature economy is directly related to saving material. This natural lattice structure is very porous and has a low volume fraction of solid. Natural lattice structure is attractive for lightweight Structures, packaging and insulating purposes. Scientists and engineers have been taking inspiration from nature to understand this lattice structure to replicate this into man-made design. Natural topologies and lattice structures have then been researched extensively for making man-made structures efficient in terms of material and energy as per functional needs. Some of the one-dimensional topologies, like spider webs, although lightweight exhibit very high load carrying capacities; honeycombs two-dimensional prismatic lattice structure has dominated engineering cellular materials in many applications over two decades' foams like trabecular bone, cork, and sea shell are examples of three-dimensional lattice structure recently extensively replicated and analyzed. All these natural lattice structures can be divided into two different types: a) open cell lattice structure b) close cell lattice structure. Cork, balsa wood, a leaf, have close cell lattice structures, whereas a bone has an open cell structure.

Open cell structure can be defined as kind of structure which made of connection of struts by points not by the connection of wall. Or the cell connected through the open face. Closed cell structure are those whose faces are solid too, so that each cell is sealed off from its neighbors.

These close cell can be designed following two principles: 1) the main mechanical properties can be derived entirely from that of cell edges or surfaces identical with those of an open cell lattice structure and thin solid membranes close off the cell faces; 2) substantial fraction of solid is at the faces of the cell and not at the edge hence in this case cell face contributes the dominant mechanical property instead of edges as explained in the first type.

Traditionally open cell lattice structure and close cell lattice structure were manufactured with materials like ceramics, metal, polymer with the foaming process. Additive manufacturing which is freeform layer by layer manufacturing process has allowed to fabricate these structures with ease. Open cell lattice structure with the help of support structure has been fabricated with all the Additive manufacturing process. Fabrication of close cell lattice structure has not been reported. Closed cell lattice structure offer advantages over open cell lattice structure. Close cell lattice structure has better strength than open cell. The close cell lattice when filled with air or fluid can further enhance the stiffness and strength which can be used as vibration damping, shock absorbing, load bearing structure, thermal conductivity characteristics.

SUMMARY OF THE INVENTION

In this invention design and additive manufacturing of bio-mimicked three-dimensional laminated structures are introduced. Bio-mimicked three-dimensional laminated structure can be designed in two ways: i) global-close type of bio-mimicked three-dimensional laminated structures ii) local-close type of bio-mimicked three-dimensional laminated structures. In a global-close type of bio-mimicked three-dimensional laminated structure, the particle units in the bio-mimicked three-dimensional laminated structure is enclosed entirely from outside either by thin solid membrane or thick solid membrane, whereas local-close type of bio-mimicked three-dimensional laminated structure, each particle unit in bio-mimicked three-dimensional laminated structure is individually closed with thick or thin solid membrane at the face and tessellated into design space. This invention shows successful fabrication of bio-mimicked three-dimensional laminated structure by additive manufacturing with material extrusion process. The bio-mimicked three-dimensional laminated structures here considered are shell-shaped, bio-mimicked structures from the sea urchin shape, as it is a mechanically stable load-bearing and has a continuous surface for printing with minimum retraction. The close bio-mimicked three-dimensional laminated structure is then obtained as periodically tessellation of the unit cell, with the concept of close packing which can be seen in natural material like bee honeycomb.

Fluid or fluid-like materials may be liquids, gases, gel, powders and Solids of relatively low elastic or plastic deformation strength in relation to the cell wall material. This aggregate arrangements of cells with fluid can enhance or protect during crush with compressive forces. The size of the cell will purely depend on application and additive manufacturing process. This design can be utilized in a variety of Situations and application. The design of the unit lattice structure can be influenced by three major properties of lattice structure, i.e.: (1) Properties of material; (2) size of unit lattice cell; (3) the relative density of lattice structure and selection of the lattice cell and filler materials coincides with the intended application. Also, it is important to select mutually compatible cell and filler materials. For example, in the case of customized shoe midsole application or for micro damping application, the outer material of the cell walls will necessarily be hyper elastic material like thermoplastic polyurethane (TPU). The close cells may be encapsulated with pressurized gas or "relatively soft" like gel in relation to the hyper elastic property of cell wall material. In the case of biomedical application, the outer cell material of closed cell will be biocompatible material like titanium or titanium alloy and can be encapsulated with polymeric material or soft material like magnesium, lithium or graphite which is powder material.

An advantage of present invention is that close cell lattice structure are very difficult to additive manufacture due to support structure used during the fabrication of lattice structure. A support-less lattice structure which requires no support during fabrication can be used to fabricate close cell structure. The close lattice structure is successfully additively manufactured using material extrusion process with PLA filament. Close cell lattice structures are designed with the concept of support-less lattice structures which is shell type, inspired by sea urchins. This periodic close cell lattice structure offers great potential for the fabrication parts with a wide range of volume fraction/density and different unit cell sizes. This type of lattice reduces the material, energy consumption, and production as it has high load-bearing capacity when compared to open cell and no post-processing is involved to remove the support from the lattice. Close cell lattice structures have also a design advantage as it shows strong load-bearing capacity compared to open cell lattice structure. Other relevant findings can be summarized as follows:

SEM results demonstrate that close cell lattice structures can be fabricated with the material extrusion process as no imperfections such as sagging, distortion or broken were observed on the close cell lattice structures. The cell size of same density has an important role for load-bearing structure as all samples of different design showed that smaller cell size has better stiffness and fail-safe design due to improved resistance to buckling. The same holds for the load-bearing structure application, as SU (shaped like a sea urchin) local close cell lattice structure with small cell size would give high strength and fail-safe design if compared to open cell or global close cell structure. in particular, SU local close cell has almost same stiffness as SU global close cell but 46% higher and 25% higher compared to benchmarked honeycomb and open cell lattice structures.

DETAILED DESCRIPTION OF THE PREFERRED EMBODIMENTS

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

There are two goals of the present invention as below:

1) To design and additive manufacture bioinspired open cell and closed cell from support-less lattice structure which will eliminate the need for support structure provided during additive manufacturing. These lattices should be embedded into design space and printed without retraction and support with polymer filament to make FDM process more efficient, high speed and better build quality.

2) To compare the mechanical properties of local closed, global closed and open cell lattice structure and establish the relationship between structural performance and cell size with the benchmarked global closed honeycomb lattice structure.

Figure 1:
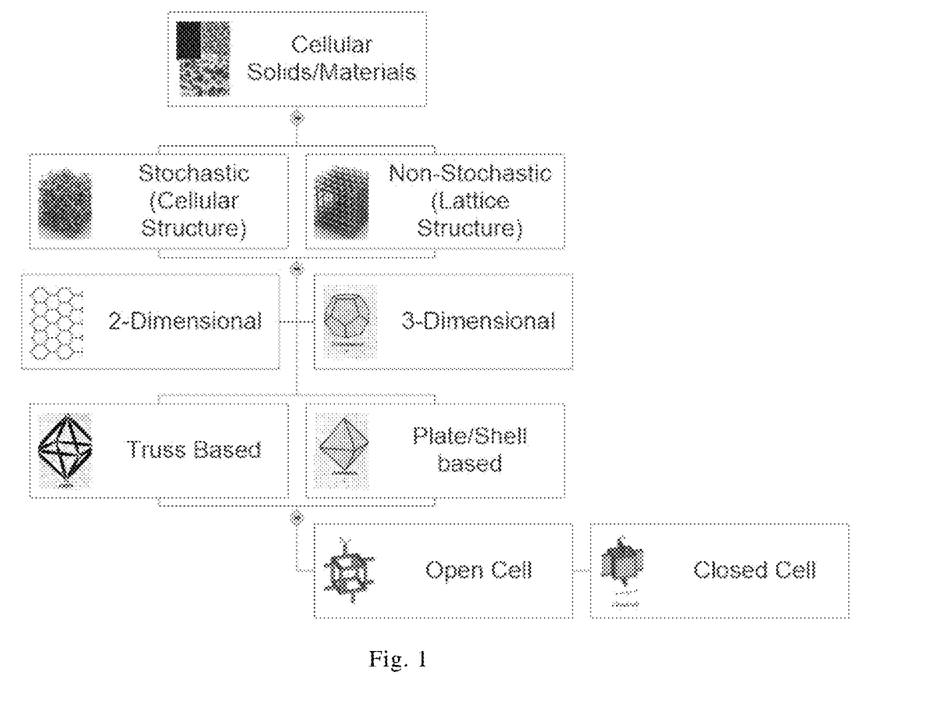
FIG. 1 is the classified of cellular solids.

FIG. 1 shows the classified of cellular solids, in nature cellular structures can be seen either two-dimensional array of prismatic cells or three-dimensional array of polyhedral cells. All this cellular solid can be absorbed to have different shape, form and tessellation than other. These microstructural features of cellular solids are responsible for the different mechanical and functional property of cellular materials. About 2D Cellular Solids are the simplest structures among the cellular solids and are made of two-dimensional array of polygons which fill a plane area and are extruded in 3rd dimension like honeycomb structure. Hence the 3rd dimension are identical and are has anisotropic property in the 3rd dimension. 3D Cellular Solids are the polyhedral cells which pack in three dimensions to fill space and can have isotropic or anisotropic mechanical property.

In some embodiments, the physical properties of a three dimensional mesh may be tailored by tailoring the volume, cell size, and/or warped geometry of a warped lattice structure in which unit cells of the three dimensional mesh are arranged. In some embodiments, the physical properties of a three dimensional mesh may be tailored by tailoring the thickness of struts defining the unit cells of the three dimensional mesh. In some embodiments, the physical properties of a three dimensional mesh may be tailored by tailoring the density of unit cells in the three dimensional mesh. The density of unit cells may be tailored by tailoring at least one of: the size of the unit cells, the degree of interconnection between the unit cells, and the base geometry of the unit cells. In some embodiments, the physical properties of a three dimensional mesh may be tailored by tailoring the material(s) used to form the three dimensional mesh.

Figure 2:
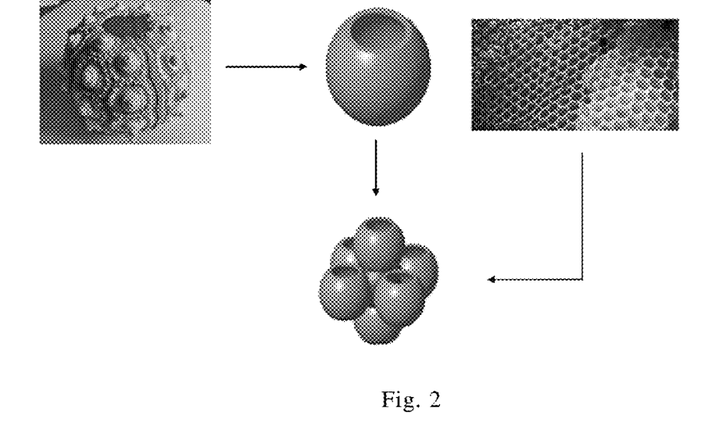
FIG. 2 is a designed schematic view of a bio-mimicked unit lattice stricture in the present invention.

About biomimetic design of the lattice structure, the design of unit lattice structure is bottom up where complex topology of Sea urchin or bee honeycomb is translated in to human design or lattice structure for the application of energy absorption. The biomimicking level is only the organism level and imitation of its morphology in the present invention. Moreover, the unit lattice with six faces is surrounded by exactly six lattices in the X, Y, and Z directions and is tightly packed as densely as possible. This type of packing or connection has no remaining void between honeycomb or collagenous fiber plate. Hence, this makes tessellation of close lattice as the periodic and unary type with face to face connection in all three directions lattices as seen in FIG. 2.

As mentioned above natural cellular structures can be divided into two different types: a) open cell cellular structure, or b) closed cell cellular structure. In nature cork, balsa wood, and leaves have closed cell structures, whereas a bone has an open cell structure. The design of closed cells is more complicated than that of open cells.

Therefore, the three-dimensional laminated structure of the present invention can be composed of a plurality of closed or open unit lattice structures (hereinafter referred to as particle units) closely connected face to face, and in the process of manufacturing by three-dimensional printing, there is no need additional support structure to be used.

Figure 3A:
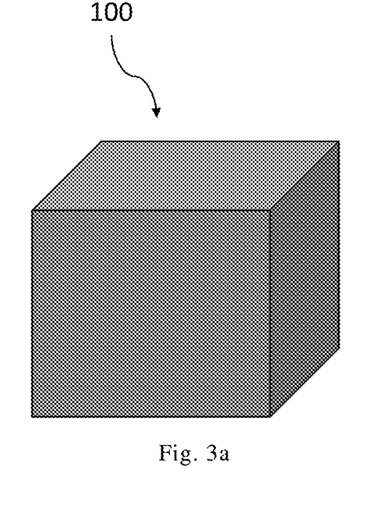
FIG. 3a is a three-dimensional schematic diagram showing the appearance of the three-dimensional laminated structure in the first embodiment of the present invention.
Figure 3B:
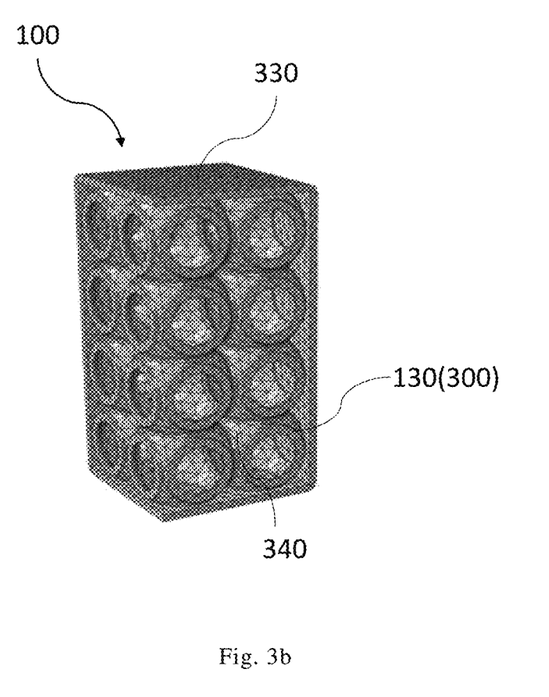
FIG. 3b is a schematic diagram showing the cross-sectional structure of the three-dimensional laminated structure in the first embodiment of the present invention.

FIG. 3a and FIG. 3b respectively show the three-dimensional schematic view and section view of the first embodiment of the present invention. In the embodiment, the three-dimensional laminated structure 100 is a global-closed type with a completely closed surface, which comprises a flexible lattice structure 130 composed of a plurality of particle units 300 and a plate portion 330 deposed the outer surface of each side of the flexible lattice structure 130.

Figure 3C:
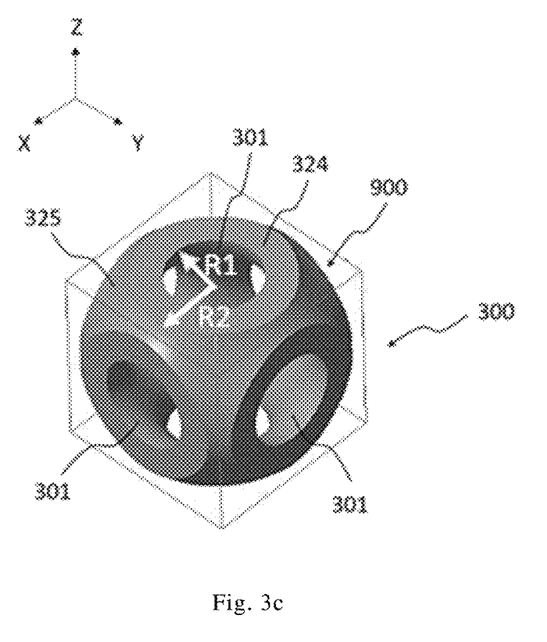
FIG. 3c is a schematic diagram showing the structure of the particle unit in the first embodiment of the present invention.

Furthermore, FIG. 3c shows the three-dimensional schematic view of the particle unit 300. The particle unit 300 is an opened hollow shell with a specific thickness. The opened hollow shell has six planar and each planar of which has an opening portion 301, an annular portion 324 surrounding of the opening portion 301, and a curved portion 325 connecting the adjacent annular portions 324. Each of the particle units 300 is abutted against each other via the annular portion 324, and uniformly disposed and evenly distributed in the X-axis, the Y-axis, and the Z-axis direction and evenly distributed as a lattice matrix of an array grid in an identical plane. In addition, the curved portions 325 of each of the particle units 300 do not contact each other, thus a plurality of the through holes 340 are formed in the flexible lattice structure 130.

The particle unit 300 is spheroid oblate, and the opening portions 301 are disposed in pair in the X-axis direction, the Y-axis direction, and the Z-axis direction on the housing layer of the particle unit 300 symmetrically with respect to the geometric centroid of the particle unit 300. Preferably, the particle unit 300 have the same equivalent diameter L and can be respectively accommodated in a virtual cube 900 with side length L, as shown in FIG. 3c.

According to the technical concept of the present invention, the particle unit 300 has a shell thickness in a range of from 0.5 mm~2.5 mm, and an equivalent diameter L in a range of from 2 mm to 16 mm. In addition, when the equivalent diameter of the opening portions 301 is set as R, and the ring width of the annular portions 324 adjacent to the opening portion 301 is set as W, the ratio of R to W satisfies the following relationship:

$$25 \geq R/W \geq 0.01.$$

Furthermore, the plate portion 330 is disposed on the outer surface of the flexible lattice structure 130, covering the opening portions 301 and the through holes 340 of the particle units 300 located at the outermost side of the flexible lattice structure 130, so that the flexible lattice structure 130 is framed in the box formed by the plate portion 330. From the surface point of view, the appearance of the three-dimensional laminated structure presents a cubic structure without any holes on the surface, that is, the aforementioned global-closed type. In addition, the flexible lattice structure 130 and the plate portion 330 are preferably integrally formed. Three-dimensional printing technology can be used to print the flexible lattice structure 130 and the plate portion 330 layer by layer at the same time, and there is no need to install additional supporting structure.

Figure 4A:
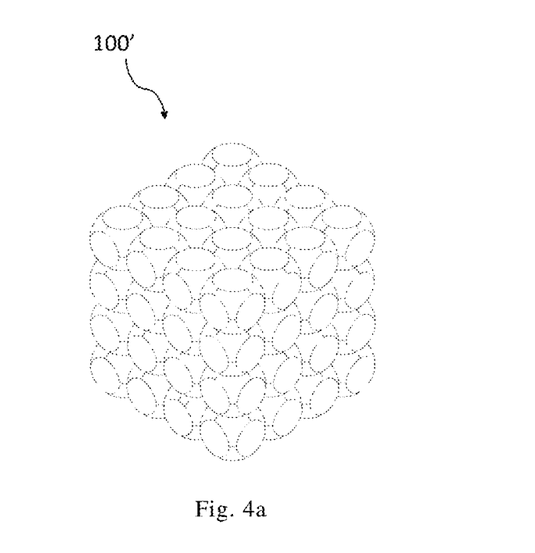
FIG. 4a is a three-dimensional schematic diagram showing the appearance of the three-dimensional laminated structure in the second embodiment of the present invention.
Figure 4B:
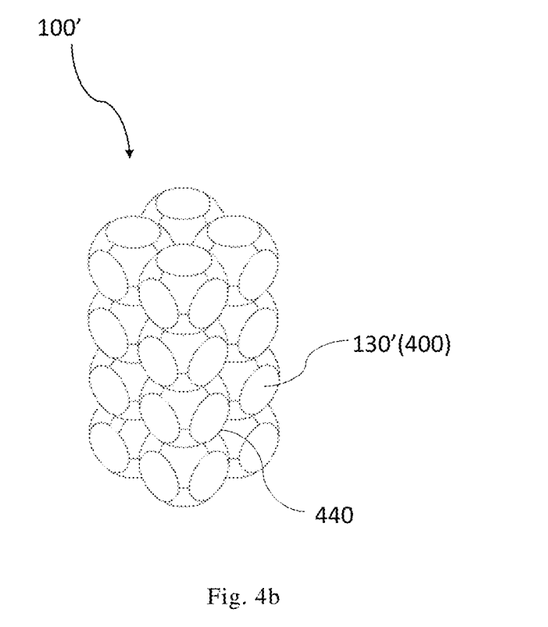
FIG. 4b is a schematic diagram showing the cross-sectional structure of the three-dimensional laminated structure in the second embodiment of the present invention.

FIG. 4a and FIG. 4b respectively show the three-dimensional schematic view and section view of the second embodiment of the present invention. In the embodiment, the three-dimensional laminated structure 100' is a local-closed type with a local closed surface, which comprises a flexible lattice structure 130' composed of a plurality of particle units 400.

Figure 4C:
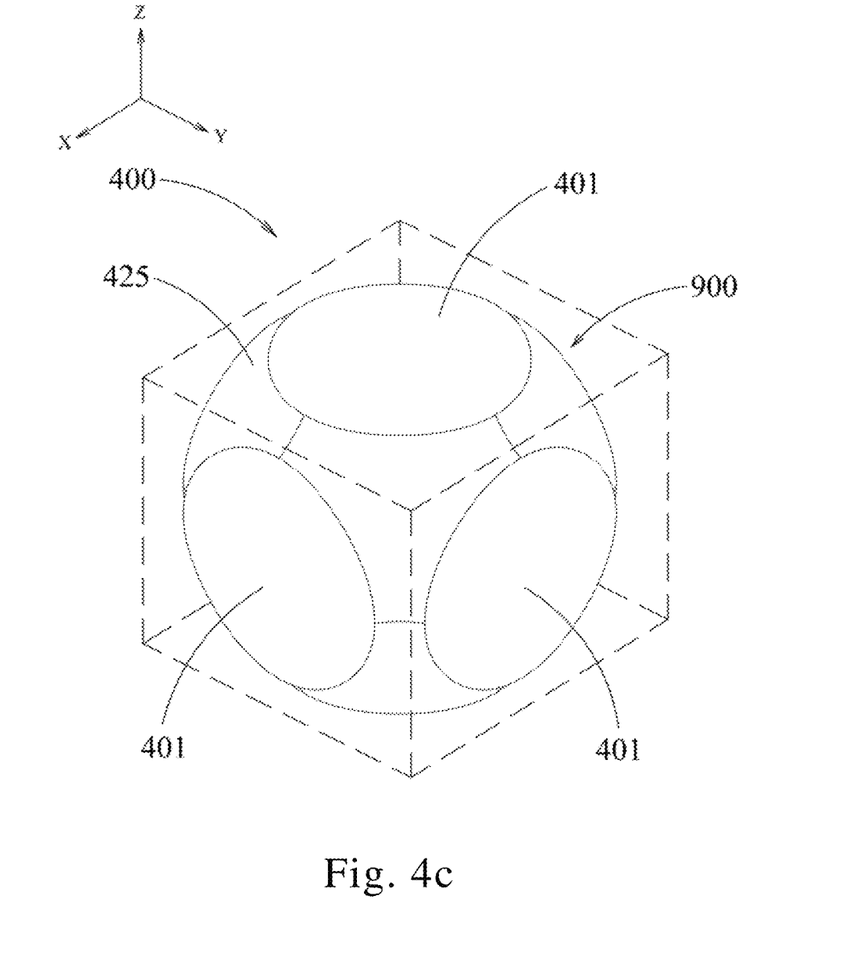
FIG. 4c is a schematic diagram showing the structure of the particle unit in the second embodiment of the present invention.

Furthermore, FIG. 4c shows the three-dimensional schematic view of the particle unit 400. The particle unit 400 is a closed hollow shell with a specific thickness. The closed hollow shell has six planar and each planar of which has a disc portion 401, and a curved portion 425 connecting the adjacent disc portions 401. Each of the particle units 400 is abutted against each other via the disc portion 401, and uniformly disposed and evenly distributed in the X-axis, the Y-axis, and the Z-axis direction and evenly distributed as a lattice matrix of an array grid in an identical plane. In addition, the curved portions 425 of each of the particle units 400 do not contact each other, thus a plurality of the through holes 440 are formed in the flexible lattice structure 130. In addition, in terms of geometric structure characteristics, the particle unit 400 in the second embodiment is equivalent to covering the opening portions 301 of the particle unit 300 in the first embodiment with a round film, and the round film is connected to the annular portion 324, so that the opening portion 301 is sealed by the film. Therefore, the thickness of the film and the thickness of the shell of the particle unit 300 can be the same or different.

In the second embodiment, the plate portion 330 as in the first embodiment is not provided. Therefore, from the surface view, the appearance of the three-dimensional laminated structure presents a cubic structure with a plurality of through holes 440 on the surface, which is the aforementioned local-closed type, but it can also be provided with a plate portion covering the through hole 440 as in the first embodiment to form a global-closed type.

The particle unit 400 is spheroid oblate, and the disc portions 401 are disposed in pair in the X-axis direction, the Y-axis direction, and the Z-axis direction on the housing layer of the particle unit 300 symmetrically with respect to the geometric centroid of the particle unit 400. Preferably, the particle unit 400 have the same equivalent diameter L and can be respectively accommodated in a virtual cube 900 with side length L, as shown in FIG. 4c. In this way, it is not necessary to install additional support structures during forming the local-closed type by additive manufacturing either. Further, due to the sealing characteristics of the particle unit 400, the particle unit 400 has better load-bearing capacity, can also be filled with a filler inside the shell to change the strength and damping characteristics thereof. The filler is a powder, liquid, soft or viscous solid, or compressed gas.

According to the technical concept of the present invention, the particle unit 300 has a shell thickness in a range of from 0.5 mm~2.5 mm, and an equivalent diameter L in a range of from 2 mm to 16 mm.

In some embodiments, the three-dimensional laminated structure can be applied to a midsole structure of shoes through the arrangement of the connected particle units and the plate portion. The geometry, interconnection, and arrangement of the interconnected particle units may be customized for a particular individual, or group of individuals. The geometry, interconnection, and arrangement of the interconnected unit cells may be based, in whole or in part, on a biometric data profile for an individual's foot. The interconnected unit cells may be arranged in a warped cubic lattice structure, which may also be based on the biometric data profile for an individual's foot.

For example, one or more of the following may be tailored for an individual or group of individuals: (i) the volumetric shape of a midsole, (ii) the stiffness (including for example compressive strength, shear strength and/or bending strength and/or torsional stiffness) of struts defining interconnected unit cells, (iii) the number of unit cells per unit volume (i.e., the density of unit cells), (iv) the degree of interconnection between unit cells (referred to herein as "valence") and (v) the base geometry of the unit cells. Each parameter (i)-(v) may vary between different zones or portions on a midsole to provide desired characteristics, for example cushioning, support, stability, ride, and/or propulsion characteristics for an individual, or group of individuals. Through three-dimensional printing, the particle units can be multiplied into the flexible lattice laminated structure and connected to each other layer by layer. All the particle units in the flexible lattice laminated structure are connected in this way, so when the user's foot pressure acts on a single particle unit, it will have an interlocking effect on the adjacent or lower particle unit.

Using the three-dimensional laminated structure of the present invention, customized midsoles may be provided with short lead times. For example, a midsole may be customized for, among other things, the width and/or length of an individual's foot, the weight of an individual, an individual's gait, and/or the type of footwear with which a midsole is intended to be used. In some embodiments, a midsole may comprise at least two regions that have different physical properties, for example different unit cell densities, different stiffness, and/or different unit cell interconnection. In some embodiments, midsoles constructed by using three-dimensional laminated structure of the present invention may be formed using an additive manufacturing method that does not require post-formation processing steps, such as cutting away undesirable parts of a midsole. Eliminating post-formation processing steps facilitates manufacturing consistency and reproducibility.

The properties of the bio-mimicked three-dimensional laminated structure totally depend on the material used for fabrication, design of the bio-mimicked three-dimensional laminated structures, embodiment of the bio-mimicked three-dimensional laminated structure into design space. Design point of view the bio-mimicked three-dimensional laminated structure is isotropic but process and material used for manufacturing can change the material behavior from isotropic to anisotropic. When filler is used inside the particle units, it can have further variation depending on the filler material. These factors may vary during actual use of the resulting material in its ultimate environment.

In the other words, parameter influencing the properties of the bio-mimicked three-dimensional laminated structure can be 1) Material physical and mechanical properties 2) Geometric properties of particle units 3) Filler material inside the particle units 4) Embodiment strategy of unit bio-mimicked three-dimensional laminated structure. For example, in the above embodiment, the material of the three-dimensional laminated structure is PLA, additive manufacturing process is material extrusion, filler is atmospheric air and design of the particle unit is spheroid oblate.

Bio-mimicked three-dimensional laminated structure fabricated with additive manufacturing process can be filled with fluid like pressurized air, slurry, powder or other material to have composite material effect. The filler can be light weight and non-reactive to outer cell wall of the bio-mimicked three-dimensional laminated structure. This brings a mechanical attribute like it can enhance the overall stiffness of structure by avoiding the local buckling or it can enhance the energy absorption ability of material. It can also be used as cushioning or damping of vibration. For the application in biomedical, automotive, aerospace where light weight, damping or elastic resilience capabilities are desired.

For the application of shoe or ski boot or military shoe. this bio-mimicked three-dimensional laminated structure can be used for customized midsole. Outer body of the cell wall can be made of hyper elastic material and the can be filled with pressurized air or softer gel like silicon to have variable pressure desired during running or walking. It can also be customized according to individual Gate or individual medical needs for orthotic insoles. This can enhance the energy absorption of midsole with light weight which is important parameter for shoe industry.

In addition, for the applications of this bio-mimicked three-dimensional laminated structure can also be biomedical industry. The particle units can be made of a biocompatible metal like titanium and can be filled with light weight, low modulus substance which are also biocompatible like graphite, sodium chloride or pressurized innocuous gas. This can improve the elastic resilience, prevent particle units from buckling during compression. This bio-mimicked three-dimensional laminated structure can be used for bone or bone reinforcement for biomedical implants or for prosthesis. Depending upon the cell geometry and on the cell-wall to cell-interior Volume ratio, elastic Stiffness values may be achieved over the range from less than 1 to over 100 GPa. As bio-mimicked three-dimensional laminated structure has high stiffness which is very much required for biomedical implants. The design of particle units is as such that it transfers the stress uniformly and has avoided the stress concentration region. Stress Shielding which are known to have adverse effects on the regrowth of natural bone and its bonding to the prosthesis.

Based on the three-dimensional laminated structure in the above embodiments, the flexible lattice structure has more than two layers, and the equivalent diameters of the unit particles arranged in different layers are the same or different.

In some embodiments, the particle units 300 in the first embodiment and the particle units 400 in the second embodiment, which is characterized in that an inner radius R1 and outer radius R2 are the two important design parameters as seen in FIG. 3c. The relative density Φ are controlled by these radius (R1,R2), while X, Y, and Z control the size of the unit bio-mimicked three-dimensional laminated structure:

$$\phi = 1 - \frac{V_L}{V_S}$$

wherein VL is the internal volume of the particle unit, Vs is the external Volume of the particle unit; wherein the or relative density Φ is in the range of from 10% to 80%. In preferred embodiment, the volume reduction coefficient or relative density Φ is in the range of from 20% to 60%. In more preferred embodiment, the volume reduction coefficient or relative density Φ is in the range of from 30% to 40%.

The three-dimensional laminated structure may be additively manufactured using a three-dimensional printing technology, for example, using technologies such as fused deposition molding, vat photopolymerization, and SLS. For a three-dimensional laminated structure having the lattice structure of the particle units (300, 400), three-dimensional printing may be performed without any support structure. In this way, additive manufacturing becomes more efficient and faster, because the printing time and the processing time can be greatly reduced. In addition, this is also beneficial in terms of material and energy. Because no support structure is used, less energy and fewer materials are consumed.

The structures of the particle units (300, 400) are bent when a compression force or a shearing force is applied during use. Such a continuous structure may be made of any elastic and/or viscoelastic material and is used for cushioning or energy absorption and release. The elastic and/or viscoelastic material is, for example, any one of TPU, an EVA copolymer, nylon 11, and a combination thereof. The continuous structure is suitable for high performance sport shoes such as runners or gym shoes. The structure may have other applications in which cushioning is required, because the lattice structure is highly stable in energy absorption and release.

Moreover, according to the technical concept of the present invention, the size of the particle units (300, 400) depends on aesthetic considerations, a user's foot pressure, and additive manufacturing capability. Further, if SLS is used to perform three-dimensional printing molding, the particle diameter distribution of a powder material is also one of the parameters that need to be considered.

Next, the following describes mechanical properties analysis for different types of three-dimensional laminated structures.

Figure 5:
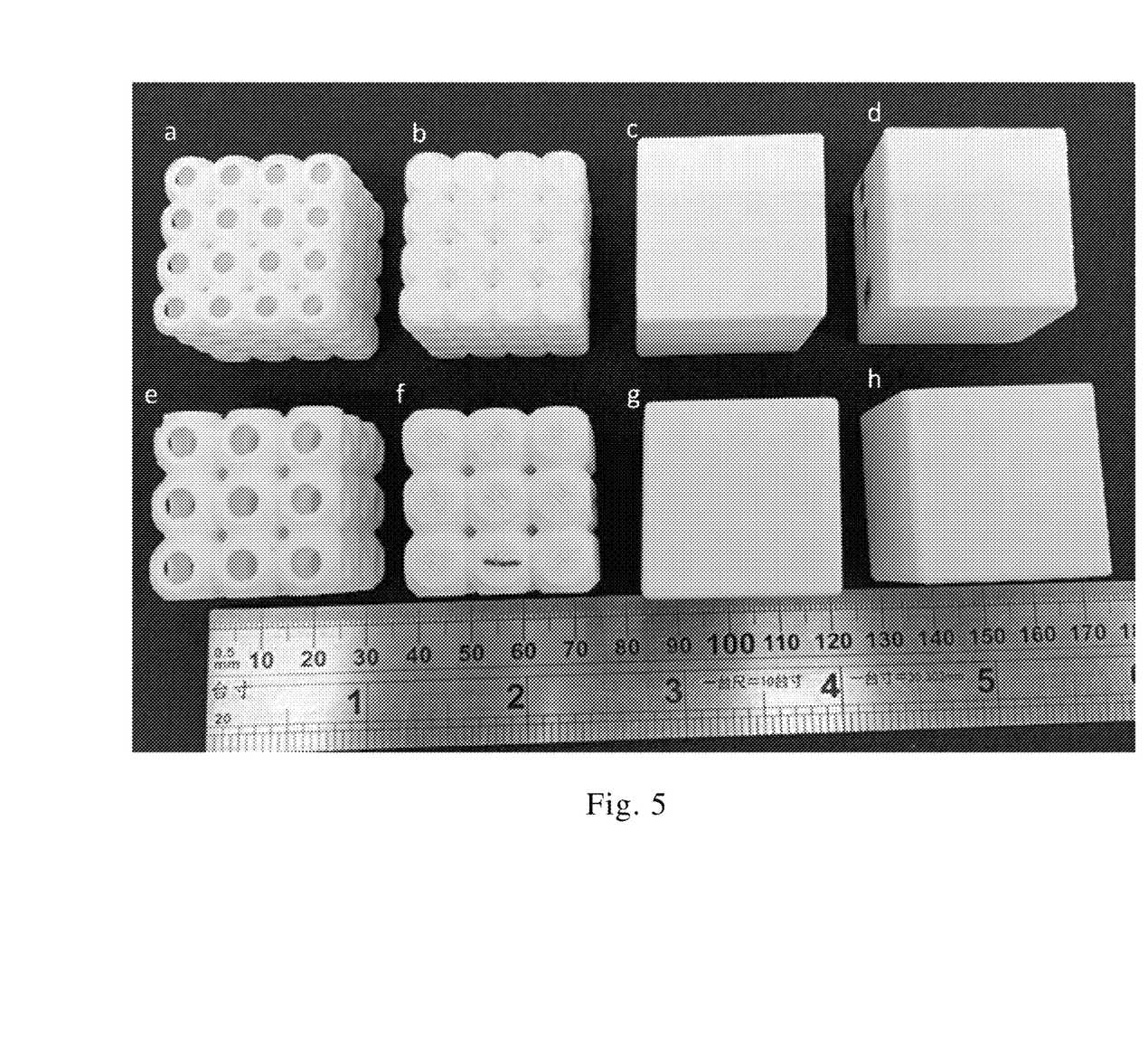
FIG. 5 is a schematic diagram showing the appearance of samples A to H in the mechanical property analysis of the present invention.
Figure 6:
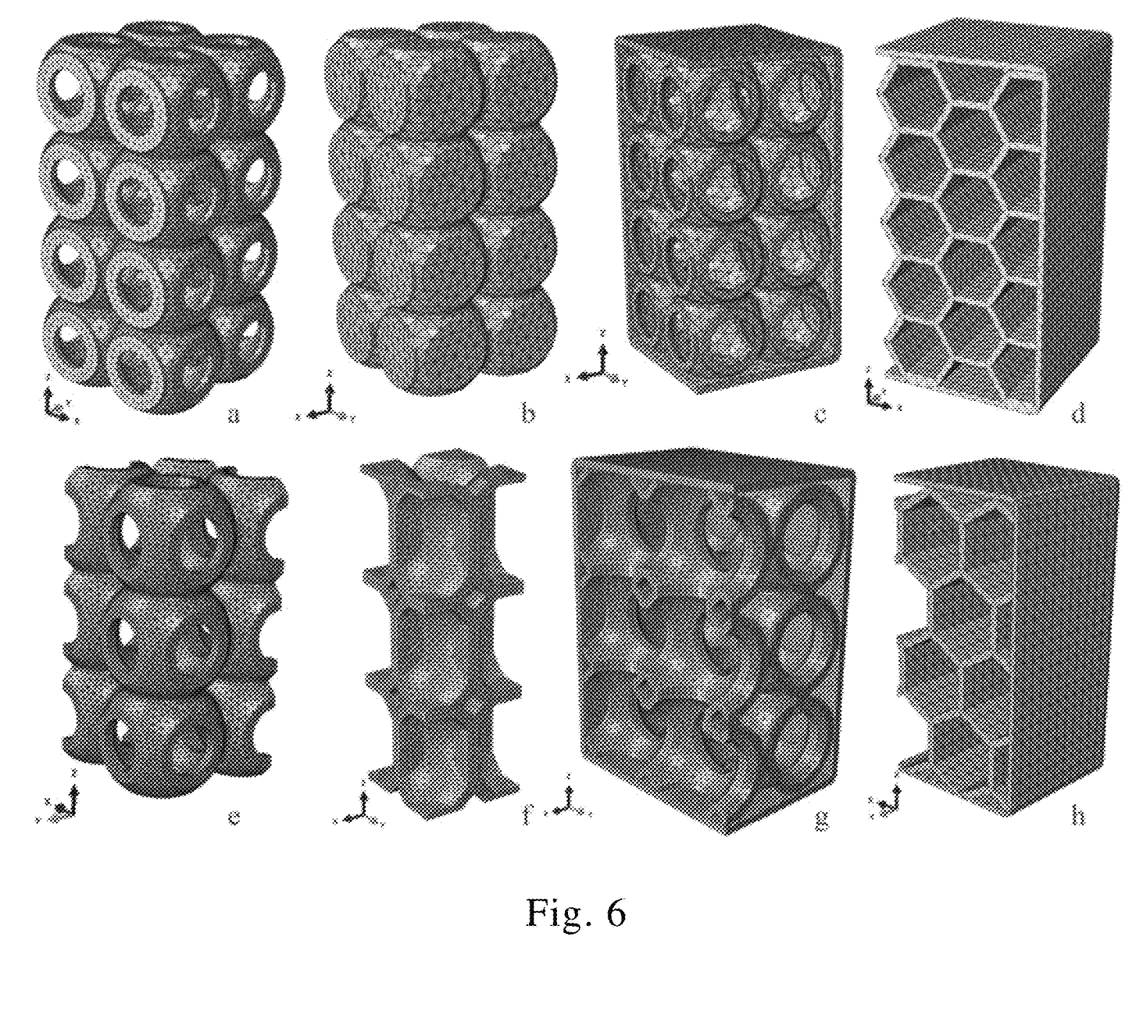
FIG. 6 is a schematic diagram showing the cross-sectional structure of samples A to H in the mechanical property analysis of the present invention.

The samples A to H used for the analysis are shown in FIG. 5, and FIG. 6 is a section view of the samples A to H. Samples A to H are made by 3D printing using PLA wires with a diameter of 1.75 mm (supplier: Mastech machine co. ltd, Model: Flashforge Beaver 3). No post-processing is done after fabrication, and all the various designs of supportless lattice structure are printed with the same parameters as seen in Table 1.

TABLE 1

| Parameters | Value |
|---|---|
| Print nozzle diameter (mm) | 0.4 |
| Nozzle temperature (° C.) | 205 |
| Bed temperature (° C.) | 60 |
| Layer height (mm) | 0.15 |
| Print infill (%) | 100 |
| Print Speed (mm/min) | 3500 |

The size information of each sample is shown in Table 2. The volumes of samples A to H are approximately 32 mm×32 mm×32 mm respectively. Among them, sample A and sample E are used the particle unit 300 as shown in the first embodiment. The size of the particle units 300 are arranged in a 4×4 matrix and a 3×3 matrix respectively to form an opening type structure; Sample B and Sample F are used the particle unit 400 shown in the second embodiment, with different sizes The particle units 400 are arranged in a 4×4 matrix and a 3×3 matrix respectively to form a local-closed type structure; Sample C and Sample G use the particle unit 300 as shown in the first embodiment. The size of the particle units 300 are arranged in a 4×4 matrix and a 3×3 matrix respectively to form a flexible lattice structure, and a plate portion 330 is framed on the outer surface of the flexible lattice structure to form a globe-closed type structure; and samples D and Sample H uses the conventional honeycomb-shaped particle units. The honeycomb-shaped particle units of different sizes are arranged in a 5×5 matrix and a 4×4 matrix respectively to form a flexible lattice structure, and a plate portion is framed on the outer surface of the flexible lattice structure to form a globe-closed type structure.

Moreover, the relative density ϕ of each sample is calculated based on the following formula:

$$\phi = 1 - \frac{V_L}{V_S}.$$

TABLE 2

| Sample | particle unit size(mm) | No. of particle unit | sample Size h₀ (mm) | Shell thickness of particle unit (mm) | thickness of plate portion (mm) | Φ (%) |
|---|---|---|---|---|---|---|
| A | 8 · 8 · 8 | 4 · 4 · 4 | 32 · 32 · 32 | 1.2 | — | 32.7 |
| B | 8 · 8 · 8 | 4 · 4 · 4 | 32 · 32 · 32 | 0.6 | 0.6 | 32.3 |
| C | 8 · 8 · 8 | 4 · 4 · 4 | 32 · 32 · 32 | 0.66 | 0.6 | 32.3 |
| D | Φ8 (Side length) | 5 · 5 · 5 | 32 · 32 · 32 | 0.6 | 0.6 | 32.0 |
| E | 10.7 · 10.7 · 10.7 | 3 · 3 · 3 | 32.1 · 32.1 · 32.1 | 1.59 | — | 32.3 |
| F | 10.7 · 10.7 · 10.7 | 3 · 3 · 3 | 32.1 · 32.1 · 32.1 | 1.16 | 0.6 | 32.3 |

TABLE 2-continued

| Sample | particle unit size(mm) | No. of particle unit | sample Size $h_0$ (mm) | Shell thickness of particle unit (mm) | thickness of plate portion (mm) | Φ (%) |
|---|---|---|---|---|---|---|
| G | 10.7 · 10.7 · 10.7 | 3 · 3 · 3 | 32.1 · 32.1 · 32.1 | 0.84 | 0.6 | 32.1 |
| H | Φ 11 (Side length) | 4 · 4 · 4 | 32 · 32 · 32 | 0.9 | 0.6 | 31.7 |

Uniaxial compression tests were performed on all lattice structures with an MTS 810 material test system with a load cell of 100 kN. The compressive displacement was applied at a strain rate of 5 mm/min with displacement up to 40% of height $h_0$. The loading direction is perpendicular to print direction for all samples. Load vs. displacement curves were obtained and analyzed. The analysis of the damage and failure mode was performed using visual inspection. Regarding the stress-strain relationships and the energy absorption ability calculation, these quantities are obtained with the following equations:

$$\sigma_{N,c} = \frac{P_c}{A_{0,eq}}$$

$$A_{0,eq} = \frac{V_L}{h_0} = (1-\phi)h_0^2$$

$$\varepsilon_{N,c} = \frac{u_c}{h_0}$$

$$W_c = \int_{\varepsilon=0}^{\varepsilon=\varepsilon_{0.4}} \sigma_{N,c}\varepsilon_{N,c}d\varepsilon$$

where $\sigma_{N,c}$ is the nominal compressive stress, $P_c$ the compressive load, $A_{0,eq}$ an equivalent cross section area of the cell, $\varepsilon_{N,c}$ the nominal compressive strain, $u_c$ the compressive displacement in mm, $h_0$ the initial sample height, and $W_c$ is the energy absorption per unit volume calculated up to the conventional strain $\varepsilon_{N,c}=0.4$ due to no stabilized densification strain showed by the tests.

Figure 7:
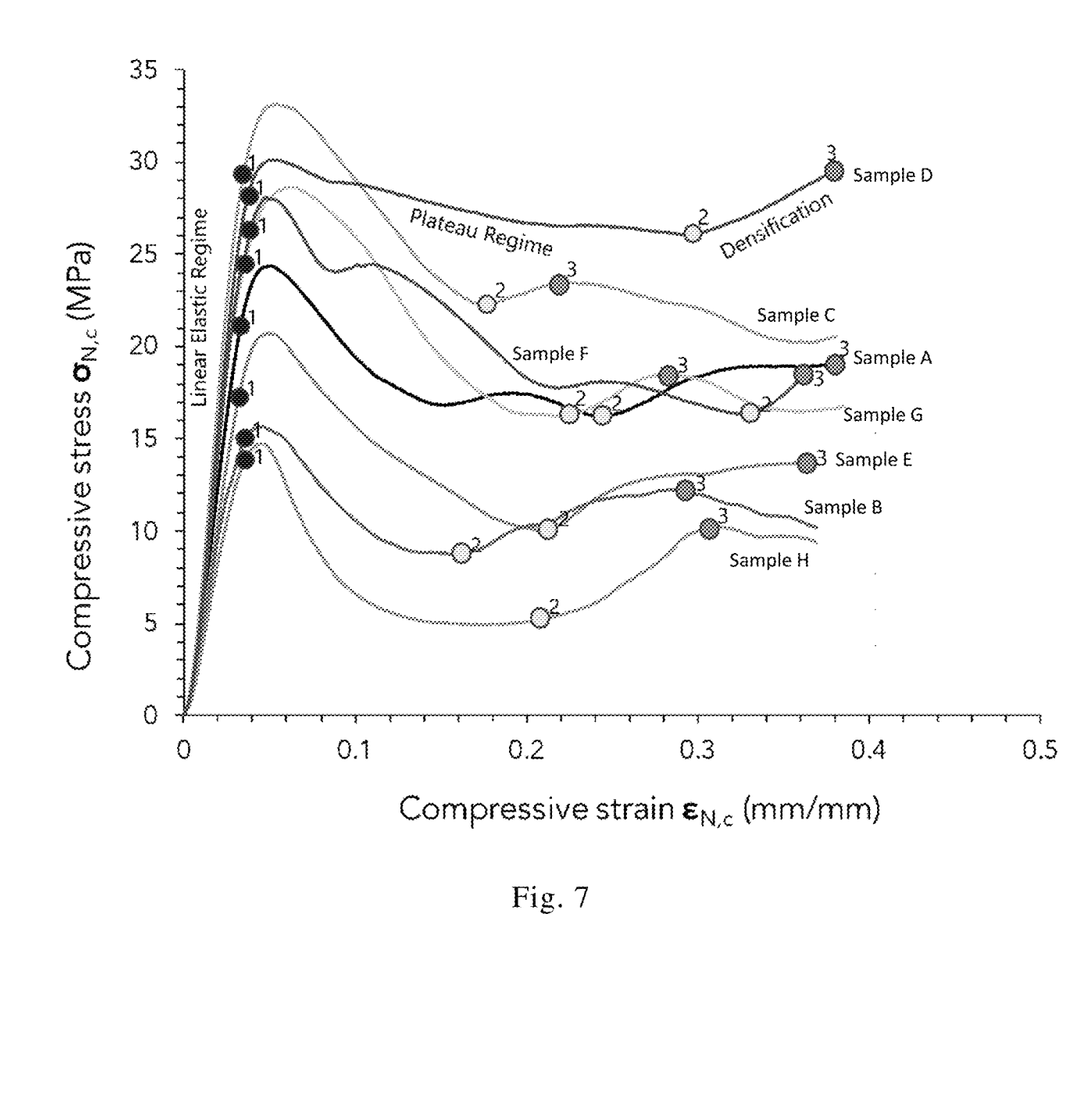
FIG. 7 is a schematic diagram showing the stress-strain relationship of samples A to H in the mechanical property analysis of the present invention.

The uniaxial compressive stress-strain curves of all the specimens tested are reported in FIG. 7. Three main deformation regimes were observed: 1) nearly linear elastic regime; 2) plateau regime which has multiple failure collapse regions; 3) densification regime where the load response rises sharply. The compressive response of all the cellular lattice structures observed resembles the polymeric lattice structures and foams; the stress-strain curves of all the lattice structures start with linear elastic regime until point (1) which is the slope of the line. After the elastic limit (1) the lattice structure starts showing permanent plastic deformation and the onset of local lattice structure buckling, and the curve enters a non-linear regime which indicates plateau regime where sudden decrease of stress is observed until point 2. This plateau region is the permanent plastic deformation which happens due to collapse of lattice structure due to buckling. Almost all of the lattice structures show recovery of strength after point (2) which is the end of plateau regime after sudden drop in the stress. Force is transferred to the second layer, and stress falling suddenly stabilizes. Subsequently, all the layers start buckling with increased stress from point 2 which is also the end of plateau regime and onset of densification. Sudden loss of strength and recovery was seen until all the layer collapsed and started behaving like a solid structure, and this region is the densification region of the lattice structure. Open type structure and local-closed type structure (samples A, B, E, F) show increasing trend of densification strain and exact densification strain could be beyond the 40% of deformation. All global-closed type structures (samples C, D, G, H) show local densification after point 2 until point 3 and beyond 40% strain when all the layer collapses could show the exact densification strain.

In addition, the stiffness, elastic limit, and energy absorption of samples A to H are shown in Table 3 respectively.

TABLE 3

| Sample | stiffness (N/mm) | elastic limit (MPa) | energy absorption (Wc (MJ/m³) |
|---|---|---|---|
| A | 7059 | 21.1 | 6.8 |
| B | 9351 | 28.2 | 10.0 |
| C | 9716 | 29.3 | 9.0 |
| D | 5043 | 15.4 | 4.0 |
| E | 5739 | 17.2 | 4.8 |
| F | 8743 | 26.2 | 7.1 |
| G | 7940 | 24.0 | 7.4 |
| H | 4770 | 14.5 | 2.9 |

According to the results shown in Table 3 above, from the point of view of the particle structure, the stiffness, elastic limit, and energy absorption of samples A to C and samples E to G are significantly higher than those of sample D and sample H. It shows that the particle unit designed to imitate the shape of the sea urchin shell is significantly better in mechanical properties than the conventional particle unit designed to imitate the shape of the honeycomb. In addition, the stiffness, elastic limit, and energy absorption of sample B and sample F are significantly higher than those of sample A and sample E, showing that the particle unit with a closed hollow shell is significantly better in mechanical properties than the particle unit with an opened hollow shell. The particle unit with a closed hollow shell has better load-bearing capacity.

Then, from the perspective of the three-dimensional laminated structure, the stiffness, elastic limit, and energy absorption of samples B, C, F, and G are higher than those of samples A and E. It shows that the a global-closed type structure and a local-closed structure of the present invention are significantly better in mechanical properties than an open type stacked structure. In addition, from the perspective of the three-dimensional laminated structures with the same structure of particle unit, it can also be observed that at the same density, a three-dimensional laminated structure composed of smaller-sized particle units (that is, more particle units per unit volume) has higher stiffness, elastic limit, and energy absorption, which shows better mechanical properties.

With the above described configuration, the bio-mimicked three-dimensional laminated structures with material extrusion processes for application in load-bearing structures. The cked three-dimensional laminated structures were designed with the concept of support-less bio-mimicked three-dimensional laminated structures, which is shell type, bio-mimicked and inspired by sea urchins. This periodic closed cell bio-mimicked three-dimensional laminated structure offers great potential for fabrication parts with a wide range of volume fraction/density and different unit cell sizes, reducing the material, energy consumption, and production because it has high load-bearing capacity compared to open cell. Also, no post-processing is involved to remove the support from the lattice.

As discussed above, the content of the present invention has been described in detail by using the examples in the foregoing embodiments. However, the present invention is not limited to these implementations. A person of ordinary skill in the art of the present invention should understand that various variations and modifications may be made without departing from the spirit and scope of the present invention. For example, the technical content described in the foregoing embodiments is combined or changed to obtain new implementations. Such implementations should be regarded as the content of the present invention. Therefore, the scope of the application seeks encompasses the appended claims and the scope defined by the claims.

What is claimed is:

1. A bio-mimicked three-dimensional laminated structure comprising a flexible lattice structure, and a plate portion; wherein
    the flexible lattice structure is composed of a plurality of particle units which are disposed in the X-axis, the Y-axis, and the Z-axis direction and evenly distributed as a lattice matrix of an array grid in an identical plane; wherein each of the particle units is an opened hollow shell, and each planar of which having an opening portion, an annular portion surrounding of the opening portions, and a curved portions connecting the adjacent annular portions; the opening portion are symmetrically arranged in the outer shell of the particle unit with respect to the geometric centroid of the particle unit; each of the particle units is abutted against each other via the annular portion; the curved portions of the adjacent particle units do not contact each other and a plurality of through holes are formed in the flexible lattice structure; and
    the plate portion is covered the outer surface of each side of the flexible lattice structure to form a three-dimensional laminated structure with a completely closed surface.

2. The bio-mimicked three-dimensional laminated structure according to claim 1, wherein when the equivalent diameter of the opening portion is set as R, and the ring width of the annular portions adjacent to the opening portion is set as W, the ratio of R to W satisfies the following relationship:

$$25 \geq R/W \geq 0.01.$$

3. The bio-mimicked three-dimensional laminated structure according to claim 1, wherein the particle unit has a shell thickness in a range of from 0.5 mm~2.5 mm, and an equivalent diameter L in a range of from 2 mm to 16 mm.

4. The bio-mimicked three-dimensional laminated structure according to claim 1, wherein the particle unit has a relative density which is in the range of from 10% to 80%.

5. The bio-mimicked three-dimensional laminated structure according to claim 1, wherein the stiffness of the three-dimensional laminated structure increases as the number of the particle units in the unit volume increases.

6. The bio-mimicked three-dimensional laminated structure according to claim 1, wherein the elastic limit of the three-dimensional laminated structure increases as the number of the particle units in the unit volume increases.

7. The bio-mimicked three-dimensional laminated structure according to claim 1, wherein the energy absorbed per unit volume of the three-dimensional laminated structure increases as the number of the particle units in the unit volume increases.

8. The bio-mimicked three-dimensional laminated structure according to claim 1, which is used to be a part of shoe midsoles.

9. A bio-mimicked three-dimensional laminated structure comprising a flexible lattice structure; wherein
    the flexible lattice structure is composed of a plurality of particle units which are disposed in the X-axis, the Y-axis, and the Z-axis direction and evenly distributed as a lattice matrix of an array grid in an identical plane; wherein each of the particle units is an closed hollow shell, and each planar of which having an disc portion, and a curved portions connecting the adjacent disc portions; the disc portion are symmetrically arranged in the outer shell of the particle unit with respect to the geometric centroid of the particle unit; each of the particle units are abutted against each other via the disc portions; the curved portions of the adjacent particle units do not contact each other and a plurality of through holes are formed in the flexible lattice structure; and
    the particle units are disposed in the X-axis, the Y-axis, and the Z-axis direction and evenly distributed as a lattice matrix of an array grid in an identical plane to form a three-dimensional laminated structure with a local closed surface.

10. The bio-mimicked three-dimensional laminated structure according to claim 9, wherein further comprises a plate portion covered the outer surface of each side of the flexible lattice structure to form a three-dimensional layered body with a completely closed surface.

11. The bio-mimicked three-dimensional laminated structure according to claim 9, wherein a thickness of the shell of each particle unit is in a range of from 0.5 mm~2.5 mm, and an equivalent diameter L of each particle unit is in a range of from 2 mm to 16 mm.

12. The bio-mimicked three-dimensional laminated structure according to claim 9, wherein the particle unit has a relative density, which is in the range of from 0.1 to 0.8.

13. The bio-mimicked three-dimensional laminated structure according to claim 9, wherein at least one of the particle units is further filled with a filler, and the filler is a powder, liquid, soft or viscous solid.

14. The bio-mimicked three-dimensional laminated structure according to claim 9, wherein the stiffness of the three-dimensional laminated structure increases as the number of the particle units in the unit volume increases.

15. The bio-mimicked three-dimensional laminated structure according to claim 9, wherein the elastic limit of the three-dimensional laminated structure increases as the number of the particle units in the unit volume increases.

16. The bio-mimicked three-dimensional laminated structure according to claim 9, wherein the energy absorbed per unit volume of the three-dimensional laminated structure increases as the number of the particle units in the unit volume increases.

17. The bio-mimicked three-dimensional laminated structure according to claim 9, which is used to be a part of shoe midsoles.

* * * * *